United States Patent
Toeniskoetter et al.

(10) Patent No.: US 7,987,689 B2
(45) Date of Patent: Aug. 2, 2011

(54) WHEELHOUSE HEMMING APPARATUS AND METHOD

(75) Inventors: James Toeniskoetter, Rochester Hills, MI (US); Ranganathan Padmanabhan, Troy, MI (US); James Steed, Pontiac, MI (US); Brian Hopkins, Ortonville, MI (US)

(73) Assignee: Hirotec America, Inc., Auburn Hills, MI (US)

( * ) Notice: Subject to any disclaimer, the term of this patent is extended or adjusted under 35 U.S.C. 154(b) by 665 days.

(21) Appl. No.: 12/157,050

(22) Filed: Jun. 6, 2008

(65) Prior Publication Data

US 2008/0302159 A1    Dec. 11, 2008

Related U.S. Application Data

(60) Provisional application No. 60/933,454, filed on Jun. 6, 2007.

(51) Int. Cl.
*B21D 39/02* (2006.01)
*B21D 7/02* (2006.01)
*B21D 11/00* (2006.01)

(52) U.S. Cl. .............. 72/214; 72/450; 901/15
(58) Field of Classification Search .......... 72/214, 72/220, 450, 451; 901/14, 15; 29/243.57, 29/243.58

See application file for complete search history.

(56) References Cited

U.S. PATENT DOCUMENTS

| | | | | |
|---|---|---|---|---|
| 5,228,190 A * | 7/1993 | Sawa | ........................ | 29/243.57 |
| 6,745,608 B2 * | 6/2004 | Miura | ........................ | 29/243.58 |
| 7,124,491 B2 * | 10/2006 | Toeniskoetter et al. | ..... | 29/243.58 |
| 7,124,611 B2 * | 10/2006 | Baulier et al. | ................... | 72/220 |
| 7,152,447 B2 * | 12/2006 | Toeniskoetter | ................ | 72/214 |
| 7,237,416 B2 * | 7/2007 | Toeniskoetter | ................ | 72/214 |
| 7,657,984 B2 * | 2/2010 | Hopkins et al. | ............... | 29/33 R |
| 2005/0229666 A1 * | 10/2005 | Toeniskoetter | ................ | 72/220 |
| 2008/0236236 A1 * | 10/2008 | Toeniskoetter | ................ | 72/220 |
| 2008/0245124 A1 * | 10/2008 | Chaker et al. | ................... | 72/214 |
| 2008/0250835 A1 * | 10/2008 | Hasegawa et al. | ............. | 72/220 |
| 2009/0139293 A1 * | 6/2009 | Kinouchi et al. | ............... | 72/220 |

\* cited by examiner

*Primary Examiner* — Willis R Wolfe, Jr.
(74) *Attorney, Agent, or Firm* — Fildes & Outland, P.C.

(57) ABSTRACT

A robotic wheelhouse hemming apparatus includes a base. A multi-axis robot is mounted on the base. The robot includes an arm. A roller hemming head is mounted on an end of the arm for roller hemming. A slide mechanism is mounted for multi-directional movement on the base. A support is mounted on the slide mechanism. An anvil is supported on the support. A registration member is integral with the support and is engagable by the roller hemming head. The robot arm is operable to manipulate the roller hemming head into engagement with the registration member, and subsequent movement of the robot arm moves the support on the slide mechanism, thereby adjusting the position of the anvil relative to a workpiece to be hemmed.

16 Claims, 7 Drawing Sheets

WHEELHOUSE HEMMING APPARATUS AND METHOD

CROSS REFERENCE TO RELATED APPLICATION

This application claims the priority of U.S. Provisional Application No. 60/933,454 filed Jun. 6, 2007.

TECHNICAL FIELD

This invention relates to robotic roller hemming, such as robotic roller hemming of wheelhouse openings on automobiles.

BACKGROUND OF THE INVENTION

It is known in the art relating to robotic roller hemming, and particularly robotic roller hemming of wheelhouse openings, to position a hemming anvil about the wheelhouse opening using a drive mechanism to move the anvil from a home position to a work position and to adjust the anvil position for wheelbase differences between various vehicle styles within a system. Also, vacuum cups, clamps, or other securement means may be used to secure the anvil to the wheelhouse. The use of vacuum cups and/or location sensors on the anvils requires the use of a tool exchange feature on the hemming robot as well as connection of an air and/or electrical source to the anvil.

SUMMARY OF THE INVENTION

The present invention provides a robotic wheelhouse hemming apparatus and method in which the anvil is mounted on a support and not suspended from the wheelhouse of a vehicle body during hemming operations. The wheelhouse hemming apparatus and method also does not require a separate drive mechanism to move the anvil and to adjust the anvil for different vehicle body styles. The apparatus and method thereby supports quick model change out. Further, no robotic tool exchanger is needed, and no pneumatic or electrical power supply needs to be routed to the anvil.

More particularly, a robotic wheelhouse hemming apparatus in accordance with the present invention includes a base. A multi-axis robot is mounted on the base. The robot includes an arm. A roller hemming head is mounted on an end of the arm for roller hemming. A slide mechanism is mounted for multi-directional movement on the base. A support is mounted on the slide mechanism. An anvil is supported on the support. A registration member is integral with the support and is engagable by the roller hemming head. The robot arm is operable to manipulate the roller hemming head into engagement with the registration member, and subsequent movement of the robot arm moves the support on the slide mechanism, thereby adjusting the position of the anvil relative to a workpiece to be hemmed.

In a specific embodiment, the support may include at least one mount to interchangeably mount the anvil on the support. An upper set of hooks and a lower set of hooks may define the mount, and the anvil may include an upper set of catches engagable with the upper set of hooks and a lower set of catches engagable with the lower set of hooks.

The slide mechanism may include a first track mounted on the base, first slides slidably engaged with the first track, a second track mounted on the first slides, and second slides slidably engaged with the second track. The support may be mounted on the second slides. The second track may be generally perpendicular to the first track. The first track may include a set of parallel rails and the second track may include a set of parallel rails. Rail brakes may be connected to the first and second slides. Stops may limit the movement of the first and second slides.

A compliance unit may be cooperable with the registration member to detect the location of the anvil relative to the workpiece to be hemmed.

The roller hemming head may include a clamp for securely gripping the anvil. The roller hemming head also may include at least one of a pre-hem roller, a final hem roller for hemming a flat hem, and a final hem roller for hemming a rope hem. The registration member may include a receiver, and one of the rollers may be insertable into the receiver, whereby insertion of the roller into the receiver engages the robot arm with the registration member.

A method of robotically hemming a wheelhouse includes the steps of:

mounting a multi-axis robot on a base, the robot including an arm;

mounting a roller hemming head on an end of the arm for roller hemming;

mounting a slide mechanism for multi-directional movement on the base;

mounting a support on the slide mechanism, the support integrally including a registration member that is engagable by the roller hemming head;

supporting an anvil on the support; and operating the robot arm to manipulate the roller hemming head into engagement with the registration member;

adjusting the position of the anvil relative to a workpiece to be hemmed by moving the robot arm to move the support on the slide mechanism.

In a specific embodiment, the slide mechanism may include a first track mounted on the base, first slides slidably engaged with the first track, a second track mounted on the first slides, and second slides slidably engaged with the second track, the support being mounted on the second slides; and the method may further include the steps of sliding the support along the first track to move the support toward and away from the workpiece, and sliding the support along the second track to move the support along the workpiece. The method may also include the step of detecting the location of the anvil relative to the workpiece with a compliance unit that is cooperable with the registration member. The support may include an upper set of hooks and a lower set of hooks, and the anvil may include an upper set of catches engagable with the upper set of hooks and a lower set of catches engagable with the lower set of hooks. The step of supporting an anvil on the support may include engaging the upper catches with the upper hooks and engaging the lower catches with the lower hooks.

These and other features and advantages of the invention will be more fully understood from the following detailed description of the invention taken together with the accompanying drawings.

DETAILED DESCRIPTION OF THE INVENTION

Figure 1:
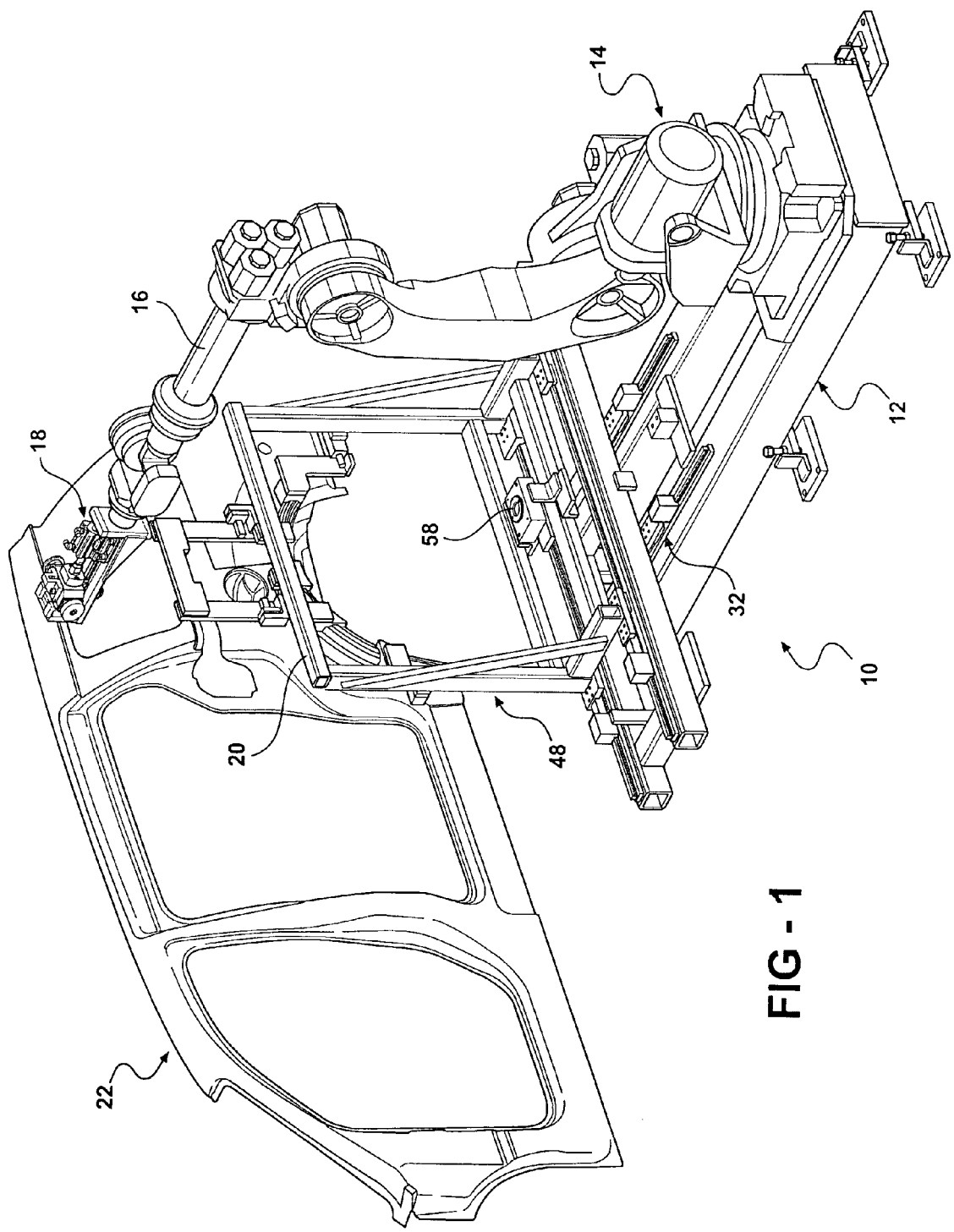
FIG. 1 is an environmental perspective view of a robotic wheelhouse hemming apparatus in accordance with the present invention.

Referring now to the drawings in detail, numeral 10 generally indicates a robotic wheelhouse hemming apparatus in accordance with the present invention. The robotic wheelhouse hemming apparatus 10 includes a support that mounts a hemming anvil, eliminating the need to mount anvil on a workpiece such as a wheelhouse of a vehicle body. The apparatus 10 also utilizes a robot to adjustably position the anvil from a non-work position to a work position relative to the vehicle wheelhouse, eliminating the need for a separate drive mechanism.

Turning to FIGS. 1 through 7, the robotic wheelhouse hemming apparatus 10 includes a base 12. A multi-axis robot 14 such as a six-axis robot or similar is mounted on the base 12. The robot 14 includes an arm 16, and a roller hemming head 18 or other similar roller hemming end effecter is mounted on an end of the arm for roller hemming of a portion of a workpiece such as a wheelhouse 20 of a vehicle body 22. For example, the roller hemming head 18 may include a pre-hem roller 24, a final hem roller 26 for hemming a flat hem, and a final hem roller 28 for hemming a rope hem. The roller hemming head 18 may also include a clamp 30 for securely gripping an object such as an anvil as described in more detail below.

A slide mechanism 32 is also mounted on the base 12 and allows for multi-directional movement about said base. As shown in detail in FIG. 2, in a specific embodiment the slide mechanism 32 includes a first track 34 mounted on the base 12, first slides 36 slidably engaged with the first track 34, a second track 38 mounted on the first slides 36, and second slides 40 slidably engaged with the second track 38. The first track 34 includes a set of parallel rails 42 such as linear rails or similar and the second track 38 similarly includes a set of parallel rails 44. The second track 38 is generally perpendicular to the first track 34. In this orientation, the first track 34 allows for forward and backward movement while the second track 38 allows for left and right movement. Rail brakes 46 are connected to first and second slides 36, 40. The rail brakes 46 may be pneumatically operated and when activated may mechanically lock on the rails 42, 44 to prevent movement of the slides 36, 40 along the rails.

A support 48 is mounted on the slide mechanism 32. As shown in detail in FIG. 3, the support 48 may be of a frame construction and may include a base 50 connected to the second slides 40 and a generally vertically disposed body including two upright portions 52 and a crossbar 54 forming an open center that allows for travel of the robot arm 16 therethrough. The support 48 is moveable in a sideways direction along the second track 38 via its connection to the second slides 40. The support 48 is also moveable forward and backward via movement of the second track 38 along the first track 34. Stops 56 limit the movement of said first and second slides 36, 40 along the first and second tracks 34, 38, respectively. For example, stops 56 along the first track 34 are contactable by the second track 38 and thereby limit the movement of the first slides 36 as the second track moves along the first track. Similarly, stops 56 along the second track 38 are contactable by the support 48 and thereby limit the movement of the second slides 40 as the support moves along the second track. The stops 56 may be generally located near the ends of the first and second tracks 34, 38.

Figure 2:
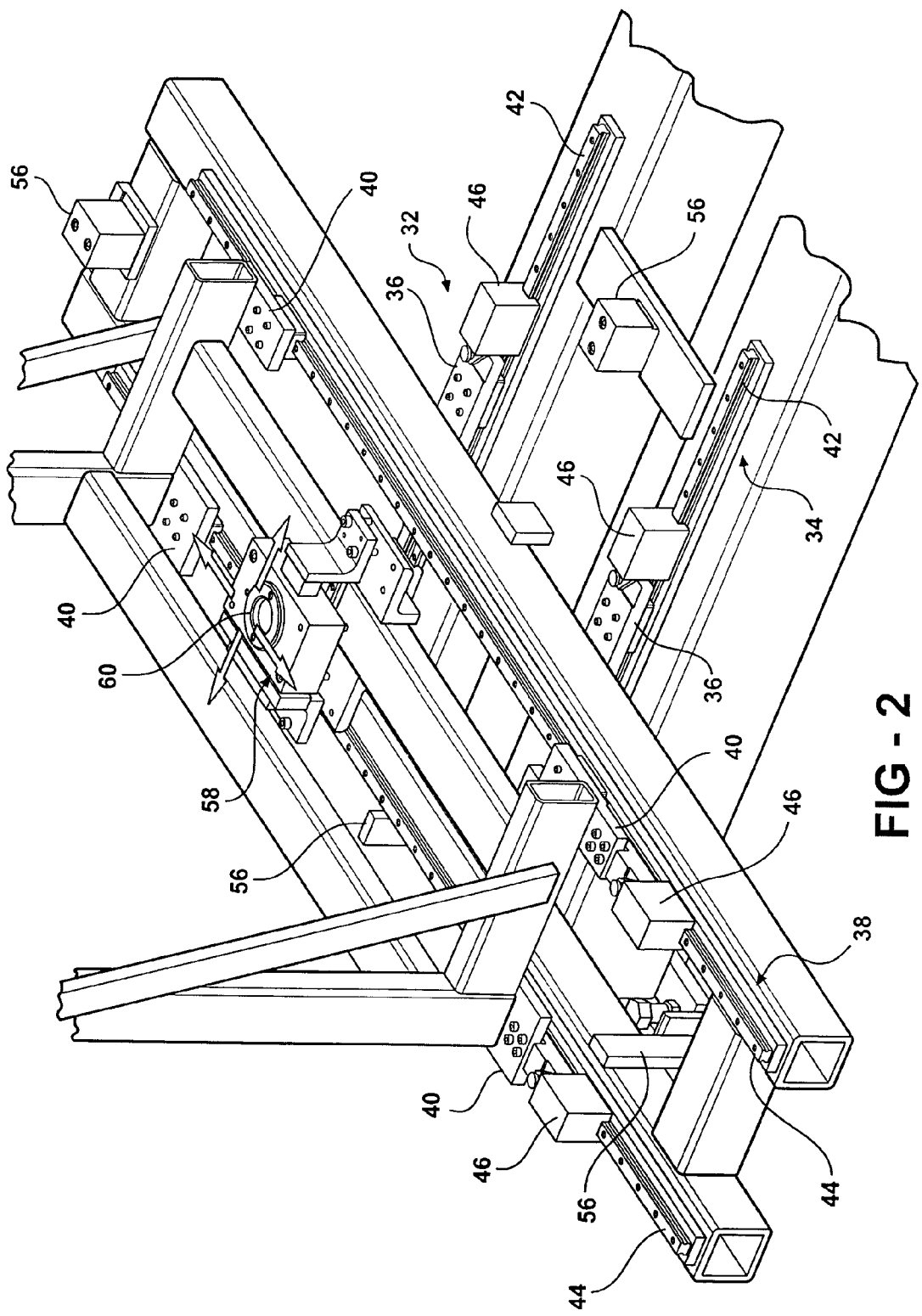
FIG. 2 is a perspective view of a slide mechanism of the robotic wheelhouse hemming apparatus.
Figure 6:
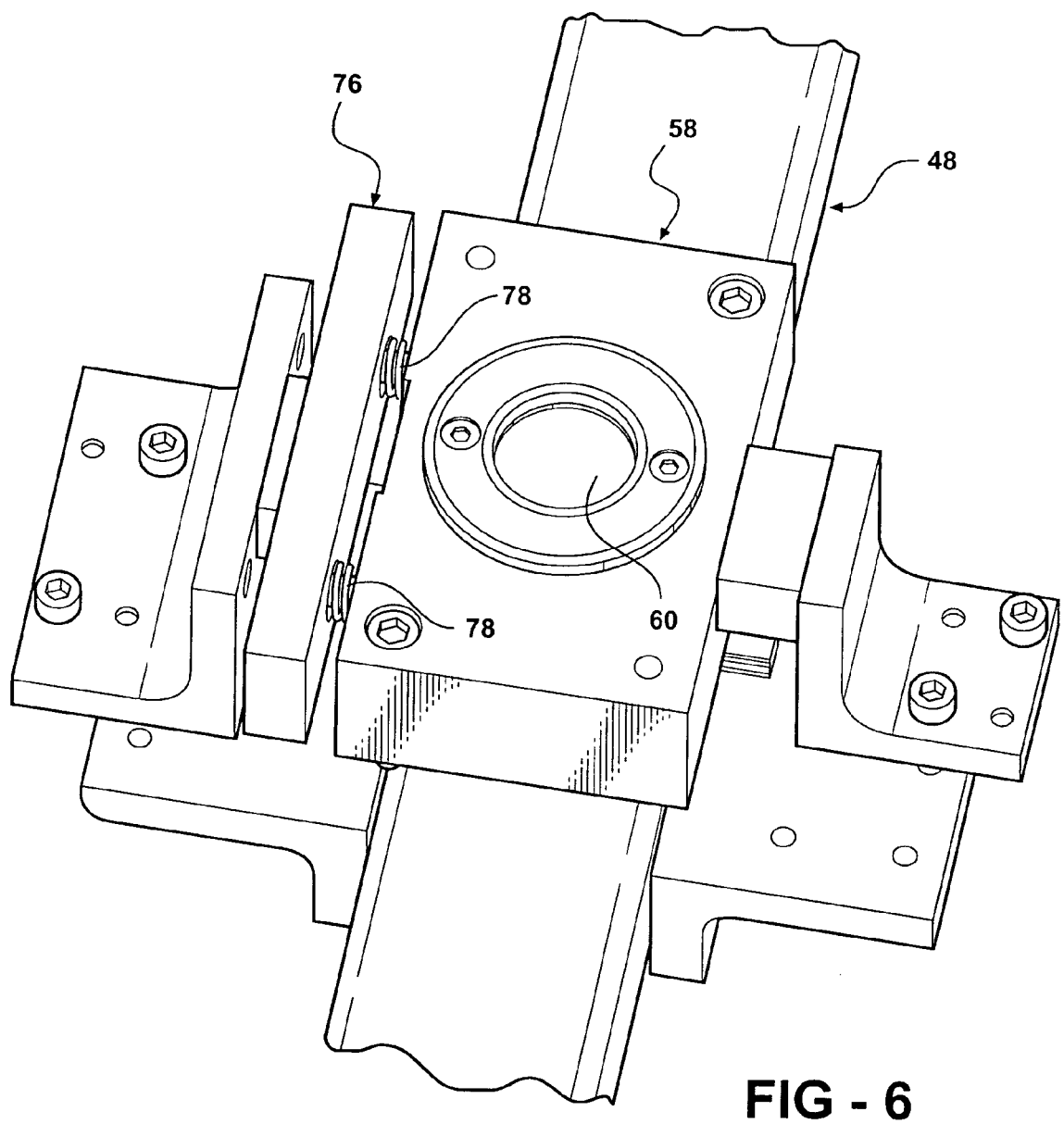
FIG. 6 is a perspective view of a registration member and compliance unit of the robotic wheelhouse hemming apparatus.
Figure 7:
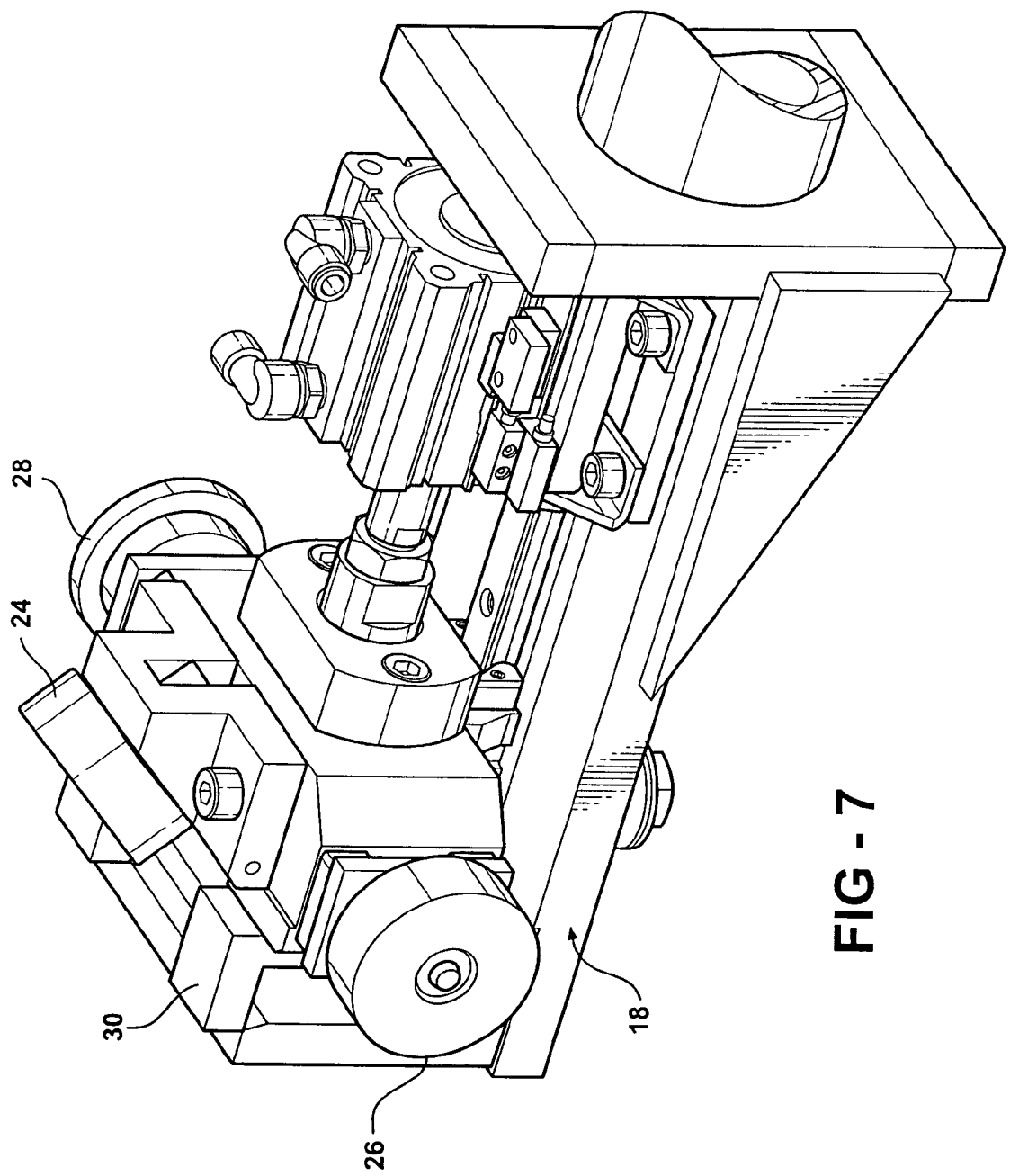
FIG. 7 is a perspective view of a roller hemming head mounted on a robot of the robotic wheelhouse hemming apparatus.

A registration member 58 is integral with the support 48. The registration member 58 is engagable by the roller hemming head 18 and functions as a handle for the robot 14 to "grasp" to move the support 48 along the tracks 34, 38. As shown in FIGS. 2 and 6, the registration member 58 includes a receiver 60 that may be shaped to receive one of the rollers 24, 26, 28 of the roller hemming head 18. For instance, the receiver 60 may be a generally cylindrical opening or depression that is cooperable with one of the rollers 24, 26, 28. Further, the robot arm 16 may manipulate the roller hemming head 18 to insert the flat hem roller 26 into the receiver 60 and thereby engage the robot arm with the registration member 58. When the robot arm 16 is engaged with the registration member 58, movement of the robot arm 16 moves the support 48. Hence, the robot arm 16 drives the support 48, and a separate drive mechanism for driving the support is not necessary.

Figure 3:
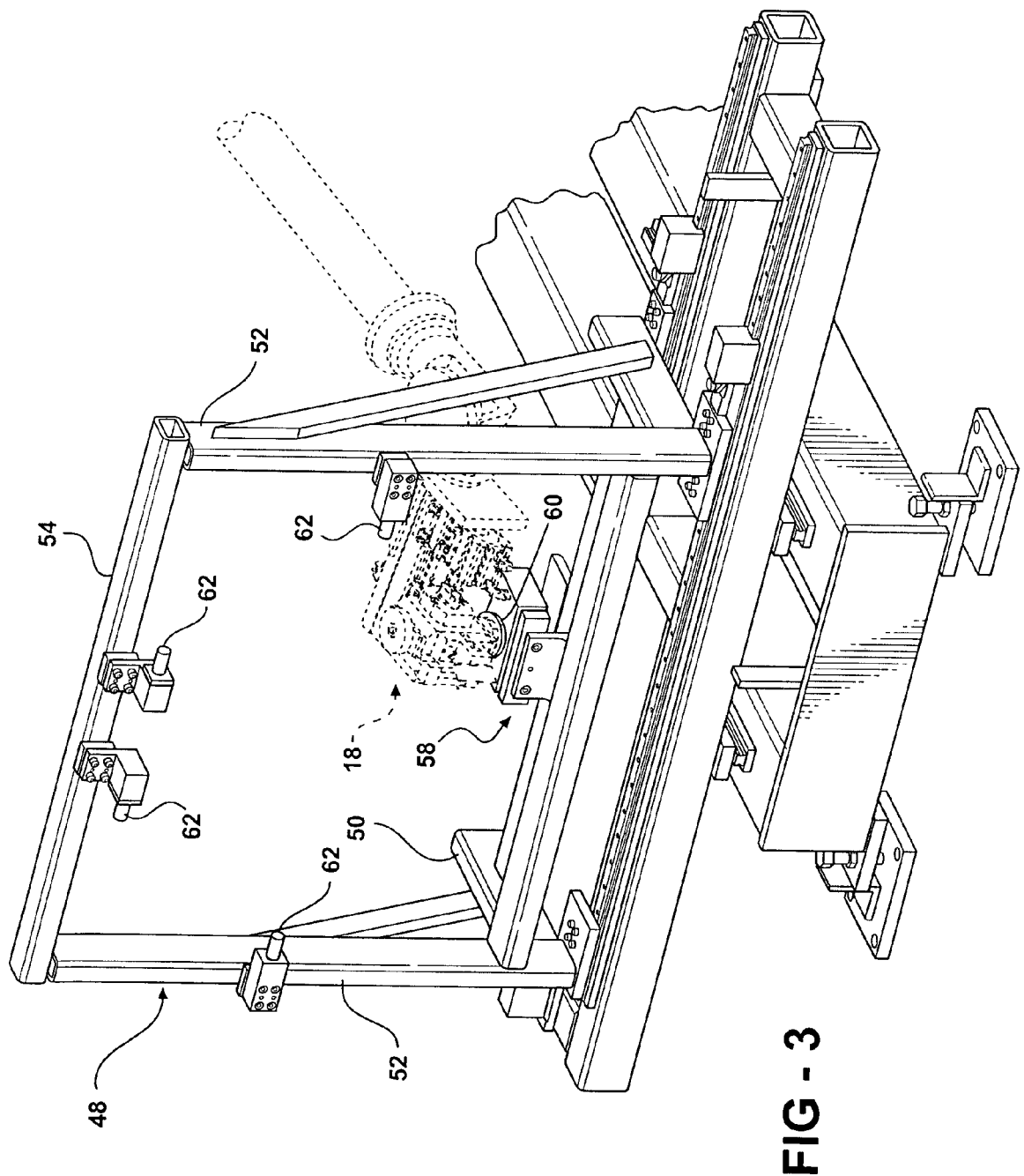
FIG. 3 is a perspective view of a support of the robotic wheelhouse hemming apparatus mounted on the slide mechanism.
Figure 4:
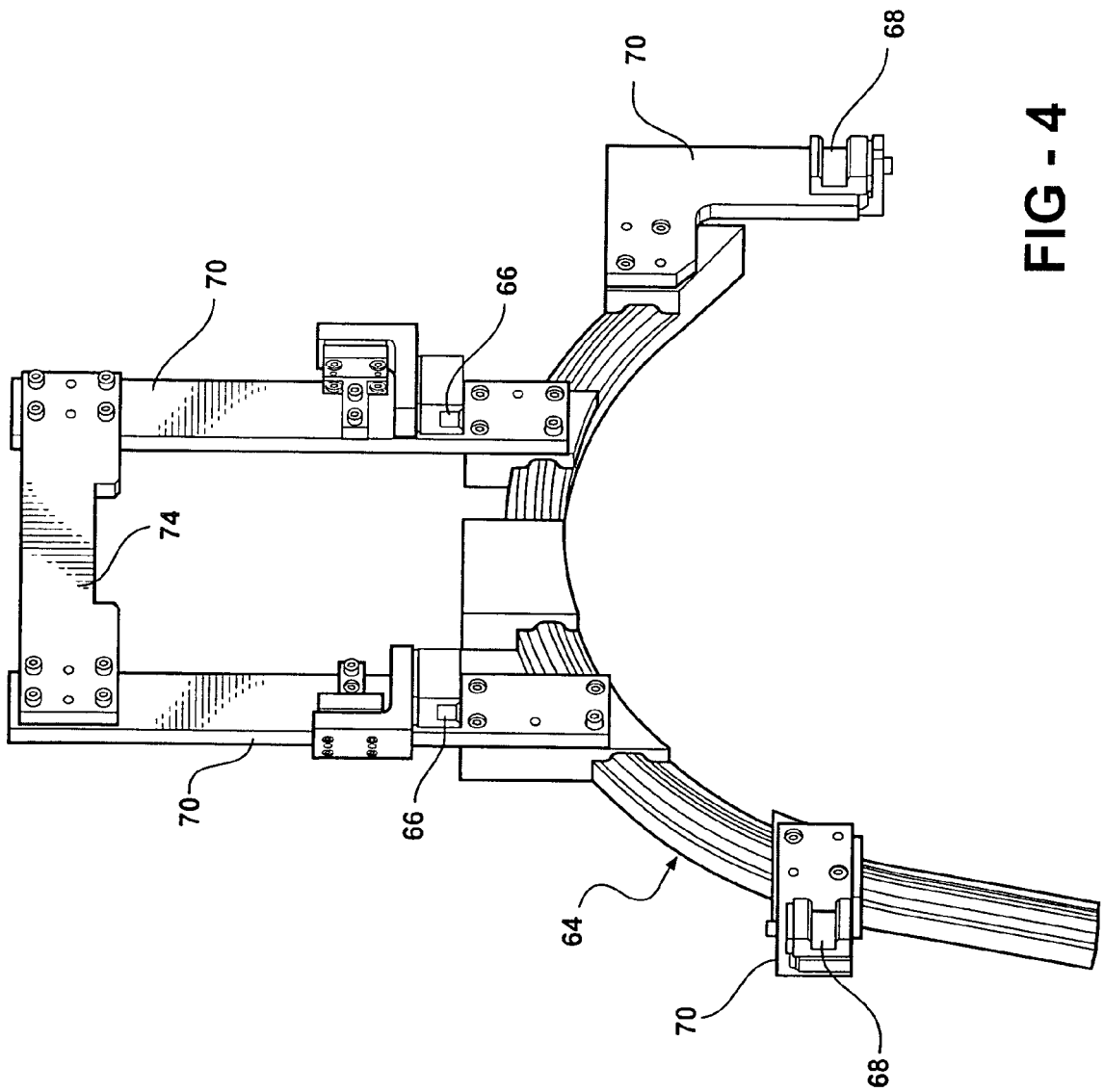
FIG. 4 is a perspective view of an anvil of the robotic wheelhouse hemming apparatus.
Figure 5:
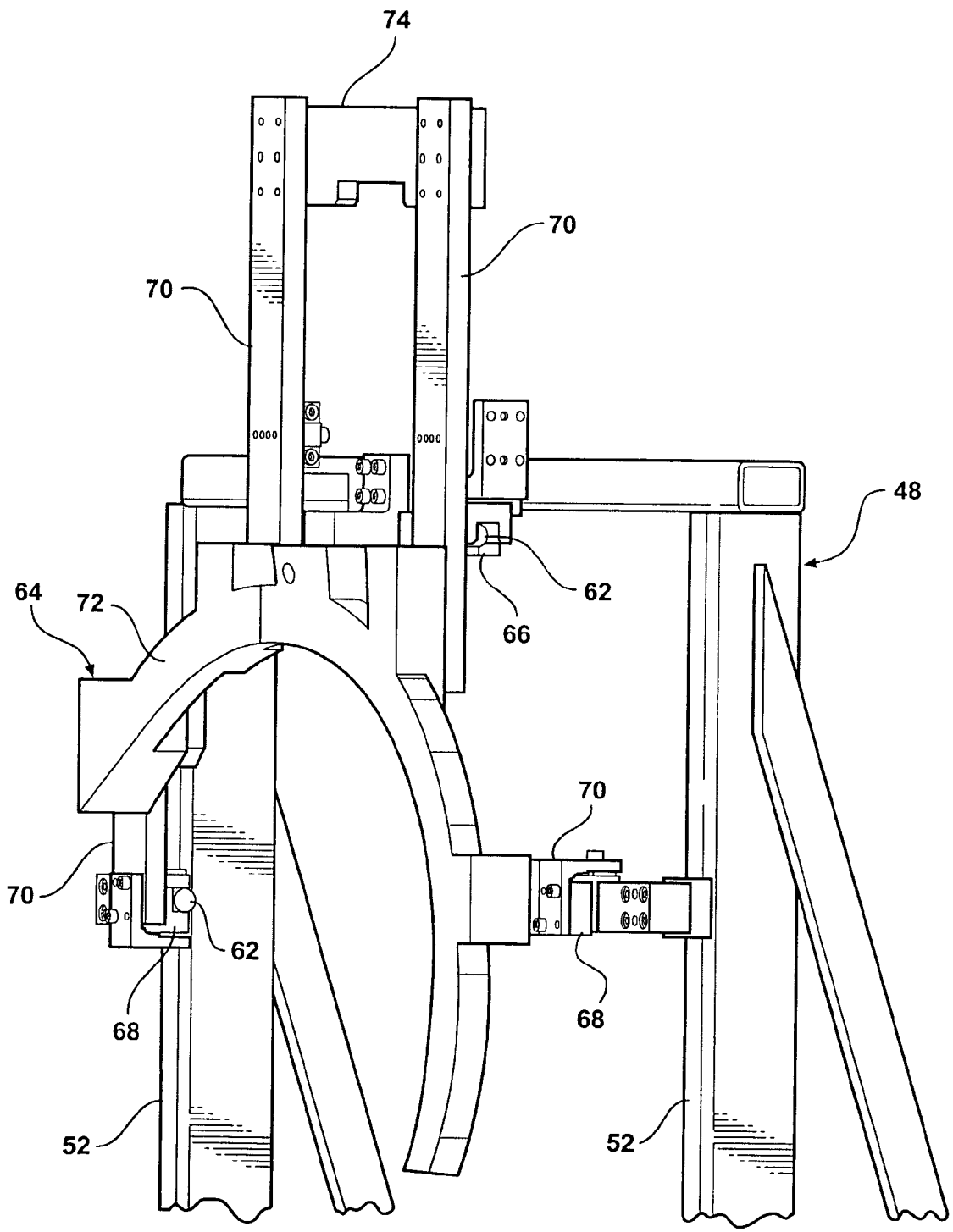
FIG. 5 is a perspective view of the anvil mounted on the support.

Turning to FIGS. 3-5, the support 48 also includes four mounts 62 for mounting and supporting an anvil 64 on the support. Two of the mounts 62 ("upper mounts") may be connected to the crossbar 54 of the support 48 while the other two mounts 62 ("lower mounts") each may be connected to one of the upright portions 52 of the support. The mounts 62 may be hooks such as rods, pins, or similar.

The anvil 64 includes an upper set of catches 66 that are engagable with the upper mounts 62 of the support 48 and a lower set of catches 68 that are engagable with the lower mounts 62 of the support. The may be mounted directly on the anvil 64 or may be mounted to extensions 70 that are mounted on the anvil. The upper and lower catches 66, 68 may be elongated U-shaped slots that are sized to receive and engage the mounts 62 of the support 48. The upper catches 66 may be disposed with the slot facing downward such that the upper catches function as hangers that hang from the upper mounts 62, thereby allowing the anvil 64 to supported on the support 58 by the force of gravity. The lower catches 68 may face outward and may rest against the lower mounts 62. The center of gravity of the anvil 64 may be positioned such that as the anvil hangs from the upper mounts 62, the anvil tilts about the upper mounts 62 such that the lower catches 68 are pressed against and engaged with the lower mounts 62. Also, when the anvil is engaged with the wheelhouse 20 of the vehicle body 22 as describe in more detail below, the lower catches 68 are forced and held in engagement with the lower mounts 62.

The anvil 64 also includes a hemming surface 72 along which the roller hemming head 18 presses the wheelhouse 20 during hemming of the wheelhouse. Further, a handle 72 may be connected to the extensions 70 that mount the upper catches 66 to allow the robot 14 to grip the anvil 64 with the roller hemming head 18 as described in more detail below.

Turning to FIG. 6, the robotic wheelhouse hemming apparatus 10 also includes a compliance unit 76 that is cooperable with the registration member 58 for detecting the location of the anvil relative to the wheelhouse 20 or other similar workpiece to be hemmed. The compliance unit 76 may include a low pressure air cylinder, gas cylinder, liquid cylinder, a spring, a urethane member, or similar resilient member 78. The compliance unit 76 biases the registration member 58 in a backward direction relative to the support 48 and aids the robot 14 in positioning the anvil 64 against the wheelhouse 20 in the forward direction. The compliance unit 76 provides a means of compliance for vehicle build variance (variance of vehicle size within tolerances for a specific model) and/or size differences among different vehicle models.

With reference again to FIGS. 1 through 7, the robotic wheelhouse hemming apparatus 10 supports the hemming anvil 64 and takes moment loads away from the vehicle body 22 during roller hemming operations in contrast to conventional hemming arrangements in which the anvil is mounted on the vehicle body. To perform a hemming operation, the robot 14 first may mount the anvil 64 on the support 48, assuming no anvil is already on the support. A plurality of different anvils may be stored on an anvil storage stand disposed within the reach of the robot arm 16. The robot 14 selects the appropriate anvil 64 from the storage rack based upon the vehicle body 22 to be hemmed. More specifically, the robot 14 manipulates the roller hemming head 18 to the anvil 64, and engages the clamp 30 on the roller hemming head 18 with the handle 74 on the anvil to grab the anvil. The anvil 64 may include a mating surface condition on the handle 74 that provides repeatable location of the roller hemming head 18 on the anvil 64. When the roller hemming head 18 is clamped on the anvil handle 74, the robot 14 then manipulates the roller hemming head 18 to move the anvil 64 to the support 48. The robot moves the anvil 64 to engage the upper catches 66 with the upper mounts 62 on the support. Once the anvil 64 is hung from the upper mounts 62, the anvil may be pivoted about the upper mounts to engage the lower catches 68 with the lower mounts 62. The robot may then release the clamp 30 from the anvil handle 74.

After the anvil 64 is mounted on the support 48, the robot 14 may move the support 48 via the slide mechanism 32 to position the anvil 64 at the wheelhouse 20 of the vehicle body 22. More specifically, the robot 14 manipulates the roller hemming head 18 to the registration member 58 and engages one of the rollers 24, 26, 28 with the receiver 60. Once the roller hemming head 18 is engaged with the receiver 60, movement of the roller hemming head by the robot 14 drives the support 48 along the first and second tracks 34, 38 of the slide mechanism 32. Movement of the support 48 along the first track 34 moves the support 48 toward and away from the vehicle body 22, and movement of the support along the second track 38 moves the support 48 in the fore/aft direction of the vehicle body. The flexibility of movement of the support 48 along the first track 34 allows for proper positioning of the anvil 64 against the wheelhouse 20 and adjustment of the anvil 64 depending on width variations from vehicle body to vehicle body, while the flexibility of the support along the second track 38 allows from proper positioning of the anvil depending on the length of the vehicle body and wheelhouse location on the vehicle body. The stops 56 limit the motion of the support 48 in both the forward/backward and fore/aft directions and prevent the support 48 from sliding off the tracks 34, 38. As the robot 14 moves the support 48 and mounted anvil 64 against the wheelhouse 20, the compliance unit 76 is compressed and allows the motion of the support and anvil to stop.

Optionally, a measurement system may be used to locate the fore/aft position of the wheelhouse 20 and to send this information to the robot 14 for accurate positioning of the anvil 64 in the wheelhouse. The measurement system may be a laser measurement system, a vision system, a system that utilizes proximity measurement sensors that are attached to the robot and which the robot uses to measure position via the motion of the robot, or another similar system.

Once the anvil 64 is properly positioned relative to the wheelhouse 20, the rail brakes 46 are engaged to lock the position of the support 48 and mounted anvil on the tracks 34, 38. The support 48 and anvil 64 are now in a working disposition. In the working disposition, the force of the wheelhouse 20 against the anvil 64 pushes the lower catches 68 against the lower mounts 62 and further prevents the anvil from moving.

After positioning and locking the support 48, the robot 14 releases from the registration member 58. The robot 14 is now ready to perform hemming operations on the wheelhouse 20 using the rollers 24, 26, 28. The robot 14 manipulates the roller hemming head 18 along the anvil 64 to compress the wheelhouse 20 between one of the rollers 24, 26, 28 and the anvil hemming surface 72, thereby hemming the wheelhouse. The roller head hemming pressure may be generated by pulling the rollers along the anvil 64 and wheelhouse 20 rather than by pushing the rollers against the anvil and wheelhouse, i.e. a "pull" force may be used rather than a "push" force.

When the hemming operation(s) are completed on the wheelhouse 20, the anvil 64 may be backed away from the vehicle body 22 to allow the vehicle body to be moved out of the work cell and to allow another vehicle body to be moved into the work cell. To move the anvil 64 away from the vehicle body 22, the robot 14 manipulates the roller hemming head 18 into engagement with the receiver 60 of the registration member 58 and the rail brakes 46 are released. The robot 14 then moves the support 48 along the first track 34 away from the vehicle body 22. If it is necessary to change the anvil 64, the robot 14 may manipulate the roller hemming head 18 to the anvil handle 74, clamp the handle with the clamp 30, remove the anvil 64 from the support 48, return the anvil to the anvil storage stand, release the anvil handle, and grab a different anvil from the anvil storage stand for placement on the support. The previously described steps are then repeated for hemming a wheelhouse of the next vehicle body brought into the work cell.

Although the invention has been described by reference to a specific embodiment, it should be understood that numerous changes may be made within the spirit and scope of the inventive concepts described. Accordingly, it is intended that the invention not be limited to the described embodiment, but that it have the full scope defined by the language of the following claims.

What is claimed is:

1. A robotic wheelhouse hemming apparatus comprising:
    a base;
    a multi-axis robot mounted on said base, said robot including an arm;
    a roller hemming head mounted on an end of said arm for roller hemming;
    a slide mechanism mounted for multi-directional movement on said base;
    a support mounted on said slide mechanism;
    an anvil supported on said support; and
    a registration member integral with said support, said registration member being engagable by said roller hemming head;
    wherein said robot arm is operable to manipulate said roller hemming head into engagement with said registration member, and subsequent movement of said robot arm moves said support on said slide mechanism, thereby adjusting the position of said anvil relative to a workpiece to be hemmed.

2. The robotic wheelhouse hemming apparatus of claim 1, including a compliance unit cooperable with said registration member for detecting the location of said anvil relative to said workpiece to be hemmed.

3. The robotic wheelhouse hemming apparatus of claim 1, wherein said roller hemming head includes a clamp for securely gripping said anvil.

4. The robotic wheelhouse hemming apparatus of claim 1, wherein said support includes at least one mount to interchangeably mount said anvil on said support.

5. The robotic wheelhouse hemming apparatus of claim 4, wherein said support includes an upper set of hooks and a lower set of hooks that define said mount, and said anvil includes an upper set of catches engagable with said upper set of hooks and a lower set of catches engagable with said lower set of hooks.

6. The robotic wheelhouse hemming apparatus of claim 1, wherein said roller hemming head includes at least one of a pre-hem roller, a final hem roller for hemming a flat hem, and a final hem roller for hemming a rope hem.

7. The robotic wheelhouse hemming apparatus of claim 6, wherein said registration member includes a receiver, and one of said rollers is insertable into said receiver, whereby insertion of said roller into said receiver engages said robot arm with said registration member.

8. The robotic wheelhouse hemming apparatus of claim 1, wherein said slide mechanism includes a first track mounted on said base, first slides slidably engaged with said first track, a second track mounted on said first slides, and second slides slidably engaged with said second track;

said support being mounted on said second slides.

9. The robotic wheelhouse hemming apparatus of claim 8, wherein said second track is generally perpendicular to said first track.

10. The robotic wheelhouse hemming apparatus of claim 8, wherein said first track includes a set of parallel rails and said second track includes a set of parallel rails.

11. The robotic wheelhouse hemming apparatus of claim 8, including rail brakes connected to first and second slides.

12. The robotic wheelhouse hemming apparatus of claim 8, including stops that limit the movement of said first and second slides.

13. A method of robotically hemming a wheelhouse, the method comprising the steps of:

mounting a multi-axis robot on a base, said robot including an arm;

mounting a roller hemming head on an end of the arm for roller hemming;

mounting a slide mechanism for multi-directional movement on the base;

mounting a support on said slide mechanism, said support integrally including a registration member that is engagable by said roller hemming head;

supporting an anvil on said support; and operating said robot arm to manipulate said roller hemming head into engagement with said registration member;

adjusting the position of said anvil relative to a workpiece to be hemmed by moving said robot arm to move said support on said slide mechanism.

14. The method of claim 13, wherein said slide mechanism includes a first track mounted on said base, first slides slidably engaged with said first track, a second track mounted on said first slides, and second slides slidably engaged with said second track, said support being mounted on said second slides; and said method further including the steps of sliding said support along said first track to move said support toward and away from said workpiece, and sliding said support along said second track to move said support along said workpiece.

15. The method of claim 13, including the step of detecting the location of said anvil relative to said workpiece with a compliance unit that is cooperable with said registration member.

16. The method of claim 13, wherein said support includes an upper set of hooks and a lower set of hooks, and said anvil includes an upper set of catches engagable with said upper set of hooks and a lower set of catches engagable with said lower set of hooks; and the step of supporting an anvil on said support includes engaging said upper catches with said upper hooks and engaging said lower catches with said lower hooks.

* * * * *